US005204039A

United States Patent [19]

Miyasaka et al.

[11] Patent Number: 5,204,039

[45] Date of Patent: Apr. 20, 1993

[54] EXTRUSION METHOD AND EXTRUDER USED FOR OBTAINING PHENOLIC RESIN PIPE

[75] Inventors: Takeshi Miyasaka; Kunio Hanaue, both of Yokohama, Japan

[73] Assignee: Mitsui Toatsu Chemicals, Inc., Tokyo, Japan

[21] Appl. No.: 797,056

[22] Filed: Nov. 25, 1991

[30] Foreign Application Priority Data

Nov. 27, 1990 [JP] Japan .................................. 2-321190

[51] Int. Cl.[5] .............................................. B29C 47/24

[52] U.S. Cl. ............................ 264/209.2; 264/211.24; 264/236; 264/347; 425/207; 425/379.1; 425/380; 425/381; 425/467

[58] Field of Search .......................... 264/209.1–209.8, 264/236, 347, 211, 211.24; 425/378.1, 379.1, 380, 381, 467, 207, 206, 144

[56] References Cited

U.S. PATENT DOCUMENTS

| | | | |
|---|---|---|---|
| 3,003,194 | 10/1961 | Hunkeler | 264/209.1 |
| 3,292,213 | 12/1966 | Donald et al. | |
| 3,317,956 | 5/1967 | Lippens | 425/376.1 |
| 3,387,331 | 6/1968 | Billings | 425/326.1 |
| 3,870,451 | 3/1975 | Gokcen | 425/378.1 |
| 4,001,368 | 1/1977 | Michizoe et al. | 264/209.6 |
| 4,240,782 | 12/1980 | McPhee et al. | 425/467 |
| 4,797,242 | 1/1989 | Fukuda et al. | 425/379.1 |
| 4,798,696 | 1/1989 | Per | 425/467 |

FOREIGN PATENT DOCUMENTS

| | | | |
|---|---|---|---|
| 169635 | 1/1986 | European Pat. Off. | |
| 213807 | 3/1987 | European Pat. Off. | |
| 288091 | 10/1988 | European Pat. Off. | |
| 2146256 | 2/1973 | France | |
| 2216097 | 8/1974 | France | |
| 48-83155 | 11/1973 | Japan | |
| 49-18949 | 2/1974 | Japan | |
| 54-23661 | 2/1979 | Japan | |
| 59-178235 | 10/1984 | Japan | 264/209.8 |
| 61-49823 | 3/1986 | Japan | 264/211 |
| 61-55151 | 3/1986 | Japan | 425/207 |
| 61-55152 | 3/1986 | Japan | 425/207 |
| 61-64748 | 4/1986 | Japan | 425/207 |
| 61-64749 | 4/1986 | Japan | 425/207 |
| 1453516 | 10/1976 | United Kingdom | |
| 1454431 | 11/1976 | United Kingdom | |
| 2078717A | 6/1982 | United Kingdom | |
| 2089717 | 6/1982 | United Kingdom | |

OTHER PUBLICATIONS

Plastics, vol. 25, No. 3, pp. 47–52 (1974).

*Primary Examiner*—Jeffery Thurlow

*Attorney, Agent, or Firm*—Burns, Doane, Swecker & Mathis

[57] ABSTRACT

An extrusion method for obtaining a long phenolic resin pipe having excellent heat resistance by using an extruder having a screw, a cylinder, a die and a mandrel, the mandrel being inserted into a through-hole formed in the screw along the screw axis and protruding into the die along the screw axis, the die satisfying the following formulas $$R_1/R_2=0.25\sim1.0$$

$$S_1/S_2=0.1\sim2.5$$

where $R_1$ is an outside diameter of the die flow path at the die outlet, $S_1$ is a cross-sectional area of the die flow path at the die outlet, $R_2$ is an outside diameter of the die flow path at the die inlet, and $S_2$ is a cross-sectional area of the die flow path at the die inlet, and the inclination of the outer periphery of the die flow path portion from the die inlet to a starting point of the uniform flow path portion having the same cross section as the die outlet is not larger than 35° to the axis of the screw, and by shaping and extruding a phenolic resin material in a state that the material after extrusion is cured so as to be able to retain its own shape, by controlling the temperature of the heating zone of the cylinder communicating with the die inlet at 120°–145° C. and the temperature of the die at 150°–200° C.; an extruder for carrying out the method; and an extruded article obtained by the method and the extruder.

7 Claims, 2 Drawing Sheets

1 2 3 8 5 6 7 4 3 3

7
6
5
3
8
3
3
4
2
1

EXTRUSION METHOD AND EXTRUDER USED FOR OBTAINING PHENOLIC RESIN PIPE

BACKGROUND OF THE INVENTION a) Field of the Invention

The present invention relates to an extrusion method for obtaining a phenolic resin pipe, an extruder in effecting said method, and an extrudate obtained from said method and extruder.

b) Description the Prior Art

As methods for molding a thermosetting resin, there are known compression molding, transfer molding, injection molding and extrusion. Various apparatuses suitable for respective methods are in use.

With respect to the extrusion as one of the methods for molding a thermosetting resin, plunger extrusion is generally used. For example, Japanese Patent Application Laid-Open No. 83155/1973 and Plastics Vol. 25, No. 3, p. 47 describe the production by plunger extrusion, of long shaped articles of simple configuration such as round bar, pipe and the like.

Plunger extrusion, however, makes it difficult to produce an extrudate of homogeneous quality and gives low productivity because it employs a high extrusion pressure in the mold cavity of the plunger extruder and is conducted intermittently.

From the above reasons, extrusion using a so-called screw type equipment is disclosed in, for example, Japanese Patent Application Laid-Open No. 23661/1979 or Japanese Patent Application Laid-Open No. 18949/1974. Such extrusion uses an extruder wherein a thermosetting resin is kneaded and melted in an extrusion unit and the molten resin is extruded from the unit and introduced into a die unit through an adapter or the like in a time as short as possible to prevent the progress of the thermosetting reaction and shaped into a final form.

With such an extruder, however, continuous and stable extrusion has been difficult because the resin has a complex flow pattern and, as a result, slight fluctuations in temperature and/or rapid progress cause rapid progress of thermosetting reaction, or appearance of flow stagnation gives rise to localized curing reaction.

That is, in the extrusion disclosed in, for example, Japanese Patent Application Laid-Open No. 23661/1979, the resin heated and melt in a cylinder is introduced into a die through an adapter and shaped into a final form. In this procedure, the resin is squeezed and then expanded around a mandrel fixed by a spider; thus, the resin makes complex flow. Consequently, stagnation of flow takes place easily, giving rise to localized curing reaction, or slight fluctuation in pressure and/or temperature causes rapid appearance of curing reaction. In order to extrude a resin while overcoming the resistance caused by complex flow and preventing the resulting flow stagnation, a very large extrusion pressure is required and a special extruder capable of generating such a pressure is needed.

Further with the above extruder, it has been unable to prevent quality problems such as (a) spider marks caused by a spider used for supporting a mandrel and (b) welds generated owing to the presence of the spider.

In order to solve these problems, extrusion by a screw extruder employing a screw having a smooth zone at the front end is proposed in, for example, U.S. Pat. No. 4,797,242, and is currently used for production of phenolic resin pipe. In this extruder, however, the smooth zone at the front end of the screw corresponds to the inside diameter of a pipe to be produced and accordingly, in view of the wall thickness of the pipe, it is impossible to produce a pipe having an outside diameter smaller than 20 mm because of the restriction of the mechanical strength of the screw. Further, since the screw and the cylinder also affects the operation of the die, production of a pipe of new size requires designing a new screw and a new cylinder, providing an economical disadvantage particularly in the production of a variety of products in small amounts.

U.K. Patent No. 2089717 discloses an extruder which corresponds to the extruder of Japanese Patent Application Laid-Open No. 23661/1979 minus the adapter and the spider and which comprises a screw, a cylinder, a die and a mandrel, wherein the mandrel is provided on the extension of the screw axis. This extruder was proposed for production of thermoplastic resin pipe. This extruder relates to an extrusion technique for obtaining a pipe of balanced strength by utilizing the property of molten thermoplastic polymer that their molecules, when flowing through a small path at a high speed, are orientated to the flow direction and by orienting the polymer molecules to different directions at the inner and outer layers of the pipe. In order to achieve the orientation in different directions, there was proposed the use of an extruder having a torpedo on the extension of a screw. This extruder was proposed for application to thermoplastic resins, as mentioned above. When the extruder was applied to extrusion of phenolic resin, i.e. thermosetting resin, extrusion became impossible in a short time after the start of pipe delivery from the die, making it impossible to obtain a satisfactory shaped article. The progress of partial curing at the die inlet was presumed to be a reason for inviting failure in extrusion.

Thus, no fully satisfactory extrusion technique has been developed for obtaining thermosetting resin shaped articles.

OBJECTS AND SUMMARY OF THE INVENTION

An object of the present invention is to provide an extrusion method and an extruder used for obtaining a phenolic resin pipe at excellent productivity.

Another object of the present invention is to provide an extrusion method capable of producing a shaped article having no quality problems such as (a) spider marks and (b) welds generated owing to the presence of spider.

Another object of the present invention is to provide an extrusion method capable of producing a pipe having an outside diameter smaller than 20 mm.

A further object of the present invention is to provide an extrusion method capable of producing a shaped article having no quality problems caused by the partial curing at the die inlet when a torpedo is used.

Still another object of the present invention is to provide a phenolic resin pipe having excellent homogeneity.

The above objects of the present invention can be achieved by providing an extrusion method for obtaining a phenolic resin pipe by using an extruder comprising a screw, a cylinder, a die and a mandrel, the mandrel being inserted into a through-hole formed in the screw along the screw axis and protruding into the die along the screw axis so as to be able to move forward and backward and being fitted to the screw so as to be able to freely rotate independently from the screw or the mandrel being firmly fitted to the front end of the screw so as to be able to rotate synchronously with the screw, the die satisfying the following formulas $$R_1/R_2=0.25\sim1.0$$

$$S_1/S_2=0.1\sim2.5$$

where $R_1$ is an outside diameter of the die flow path at the die outlet, $S_1$ is a cross-sectional area of the die flow path at the die outlet, $R_2$ is an outside diameter of the die flow path at the die inlet, and $S_2$ is a cross-sectional area of the die flow path at the die inlet, and the inclination of the outer periphery of the die flow path portion from the die inlet to a starting point of the uniform flow path portion having the same cross section as the die outlet is not larger than 35° to the axis of the screw, which method comprises shaping and extruding a phenolic resin material in a state that the material after extrusion is cured so as to be able to retain its own shape, by controlling the temperature of the heating zone of the cylinder communicating with the die inlet at 120°-145° C. and the temperature of the die at 150°-200° C.

Other objects of the present invention can be achieved by providing an extruder for preparing phenolic resin pipe, comprising a screw consisting of a feed zone, a compression zone and a metering zone, a cylinder having heating means corresponding to the feed zone, the compression zone and the metering zone, a die fitted to the front end of the cylinder, having a heating means, and a mandrel inserted into a through-hole formed in the screw along the screw axis and protruding into the die along the screw axis, or firmly fitted to the front end of the screw, the die satisfying the following formulas $$R_1/R_2=0.25\sim1.0$$

$$S_1/S_2=0.1\sim2.5$$

where $R_1$ is an outside diameter of the die flow path at the die outlet, $S_1$ is a cross-sectional area of the die flow path at the die outlet, $R_2$ is an outside diameter of the die flow path at the die inlet, and $S_2$ is a cross-sectional area of the die flow path at the die inlet, and the inclination of the outer periphery of the die flow path portion from the die inlet to the starting point of a uniform flow path portion having the same cross section as the die outlet is not larger than 35° to the axis of the screw.

According to the present invention, there can be produced easily and stably at high productivity a long phenolic resin pipe having high resistances to heat and flame, without causing resin stagnation or localized curing which has been seen in the conventional extruder owing to the complex resin flow path.

DETAILED DESCRIPTION OF THE INVENTION

The present inventors studied the technique which one of the present inventors disclosed in U.S. Pat. No. 4,797,242. As a result, there has been found an extrusion method for obtaining a phenolic resin pipe, which method uses an extruder comprising a screw consisting of a feed zone, a compression zone and a metering zone, a cylinder having heating means corresponding to the feed zone, the compression zone and the metering zone, a die fitted to the front end of the cylinder, having a heating means, and a mandrel inserted into a through-hole formed in the screw along the screw axis and protruding into the die along the screw axis, or firmly fitted to the front end of the screw, and which method comprises shaping and extruding a phenolic resin material in the die in a state that the material before extrusion is cured to a certain extent and the material after extrusion can retain its own shape.

This extrusion method has made it possible to produce a pipe having an outside diameter smaller than 20 mm which had been impossible to produce by the technique disclosed in U.S. Pat. No. 4,797,242, and further can produce many different pipes in small amounts advantageously by using different dies and different mandrels.

The extruder used in the present invention can be any of a single-screw extruder, a twin-screw extruder and a multi-screw extruder. However, the double-screw extruder and the multi-screw extruder must be those in which the screw front is integrated into a monoaxial state.

The extruder used in the present invention may have a gas vent and/or a special kneading means between the feed zone and the metering zone. The extruder may further have, at the front end of the die, a unit having a cross section very slightly smaller than the die outlet so as to be able to control the back pressure applied to the resin being shaped and extruded.

The screw is a type generally used in the extrusion of synthetic resin. It may be full-flighted or may have a torpedo shape having a smooth zone at the front end. The front end shape of the screw may be columnar or conical.

The extrusion method for phenolic resin material is described with reference to FIG. 1.

Figure 1:
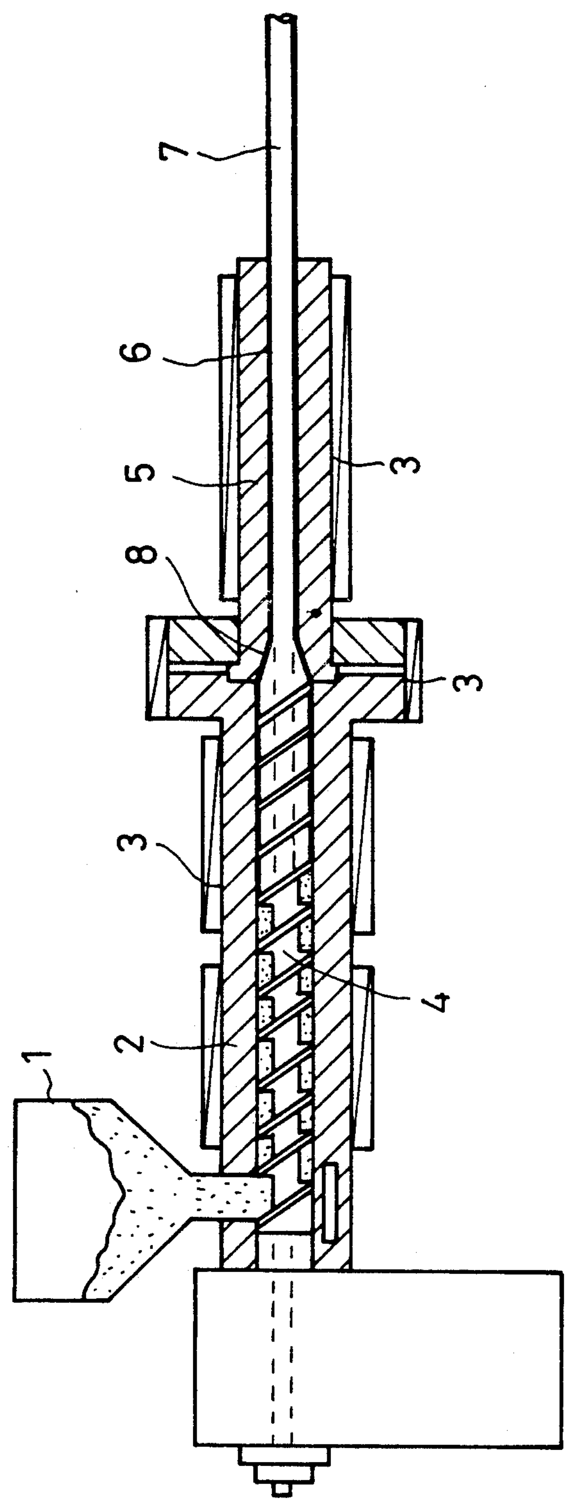
FIG. 1 illustrates a preferred extruder used in the extrusion method of the present invention.

In FIG. 1, a phenolic resin material fed from a hopper 1 is heated and melt in a cylinder 2 having heaters 3, sent forward by the rotation of a screw 4, and introduced into a die 5 in a molten state. The material at the die inlet is in a molten and homogeneous state so as to be adapted to the change of the flow path, by controlling the temperature of the heating zone of the cylinder communicating with the die inlet at 120°-145° C., preferably 125°-140° C. When the temperature of said heating zone is lower than 120° C., the material at the die inlet may not be in a molten and homogeneous state. When the temperature is higher than 145° C., the material may undergo partial curing and the smooth change of the flow path may be difficult. Thereafter, the material is heated in the die to 150°-200° C., preferably 150°-185° C., whereby the curing of the material is promoted and the material is shaped and extruded as a shaped article in a state that the material after extrusion is cured so as to be able to retain its own shape.

The heating temperature in the die is appropriately controlled depending upon the pipe thickness and extrusion speed employed. When the heating temperature is lower than 150° C., the curing reaction of the material does not proceed sufficiently. Meanwhile, heating to higher than 200° C. is unnecessary because the phenolic resin is sufficiently cured at temperatures up to 200° C.

Figure 2:
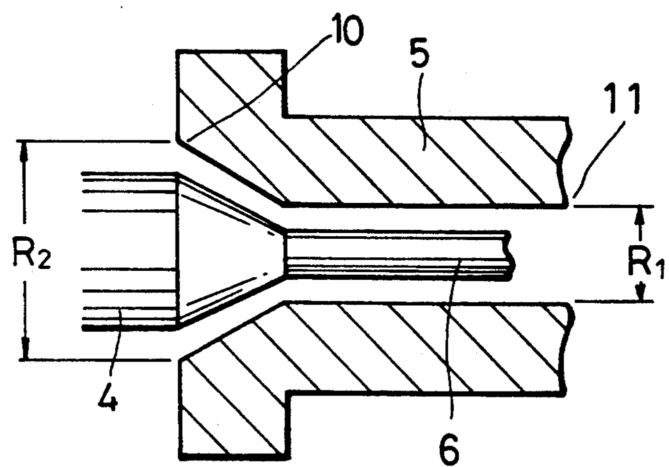
FIG. 2 is an enlarged view showing the inlet of the die in the extruder of FIG. 1.

As shown in FIG. 2, the cross section of the resin inlet 10 of the die is the same as the cross section formed by the cylinder and the screw front, and the cross section of the resin outlet 11 is the same as that of desired product. The resin flow path in the die is made so as to allow for smooth change from the inlet to the outlet.

That is, as to the die outlet 11, the outer diameter can be appropriately selected in a range of 0.25-1.0 time that of the die inlet 10 (i.e. $R_1/R_2=0.25\sim1.0$), preferably 0.3-0.9 time, and the cross-sectional area of the flow path at the die outlet 11 can be appropriately selected in a range of 0.1-2.5 times that of the die inlet 10 (i.e. $S_1S_2=0.1\sim2.5$), preferably 0.15-2.0 times. When the outer diameter of the die outlet deviates from 0.25-1.0 time that of the die inlet, or when the cross-sectional area of the flow path at the die outlet deviates from 0.1-2.5 times that of the die inlet, the change of the resin flow path is not smooth and the flow of the resin is not smooth, which invites partial stagnation of resin, excessive curing and difficult extrusion.

The inclination of the outer periphery of the flow path portion 8 from the die inlet 10 to the starting point of the uniform flow path portion having the same cross section as the die outlet 11 is not larger than 35°, preferably not larger than 30° with respect to the axis of the screw. When the inclination is larger than 35°, the change in flow path in the portion 8 is rapid, making the resin flow non-smooth.

Figure 3:
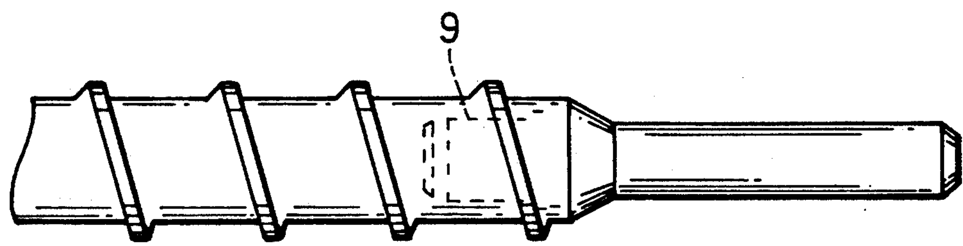
FIG. 3 is an example of a detachable mandrel.

As shown in, for example, FIG. 3, the mandrel 6 is, at one end, inserted into a through-hole 9 in the screw along the screw axis and, at other end, protruding into the die along the screw axis. Accordingly, no spider as used for supporting a mandrel in ordinary dies is necessary, whereby the flow of material resin is not hindered at all. The resin introduced into the die is sent forward through the constantly changing flow path portion in a molten state; in the uniform flow path portion having the same cross section as the die outlet, is shaped and cured; and is extruded as a shaped article 7. Here, the length of the uniform flow path portion having the same cross section as the die outlet must be determined depending upon the combination of wall thickness of article, viscosity and curing rate of material used, other extrusion conditions, etc., but can be appropriately selected in a range of usually 1D to 30D (D is the inside diameter of die), preferably 5D to 25D, more preferably 5D to 20D.

When the length of said uniform flow path portion is smaller than 1D, no sufficient curing is likely to occur and it is difficult to obtain a satisfactory shaped article. When the length is larger than 30D, the back pressure is too large and extrusion tends to be difficult.

In the extrusion method of the present invention, there is substantially no rapid change in the resin flow path from the screw front end of the extruder to the die outlet; therefore, there is no resin stagnation and there is neither localized curing reaction nor sudden curing reaction caused by the change in pressure and/or temperature.

The shaped article obtained by the extrusion method of the present invention retains its own shape already right after extrusion and, by controlling the extrusion conditions, can be sufficiently shaped and cured to such an extent that it undergoes no easy deformation by an external force. Therefore, it causes no warpage, bending, swelling, etc. when put into actual usages.

As necessary, a post-curing treatment may be conducted. The treatment can increase the thermal deformation temperature of the shaped article and allows the use of the resulting article at temperatures of, for example, 200° C. or more.

The phenolic resin material used in the present invention may comprise, as necessary, additives generally used in molding of phenolic resin, such as fillers, releasing agents thickeners, coloring agents, dispersing agents, foaming agents curing accelerators and the like.

The phenolic resin material may further comprise other polymers and organic or inorganic fibrous substances such as glass and the like.

With respect to the flow properties of the phenolic resin material used in the present invention, the material preferably gives a flow amount of 0.05-25 g when subjected to the flow test by extrusion method according to JIS K 6911. The test is conducted under conditions of test mold temperature=140° C. and extrusion pressure=150 kgf/cm$^2$. When the flow amount is smaller than 0.05 g, the uniform melting in the cylinder tends to be sacrificed; when the flow amount is larger than 25 g, the melting in the cylinder is easy but the curing in the die tends to be slow.

The present invention is hereinafter described more specifically by way of Examples. However, the present invention is by no means restricted to the following Examples.

EXAMPLE 1

An extruder having a cylinder diameter of 30 mm and an L/D ratio of 12 was used. The cylinder contained a full-flight screw having a feed zone 7D, a compression zone 1D, a metering zone 4D and a compression ratio of 1.5. A mandrel having an outer diameter of 5 mm was inserted into the screw along the screw axis. To the front end of the cylinder was fitted a die having a diameter of 9 mm, a length of 200 mm and a flow path construction as shown in Table 1. Using this extruder, extrusion was effected. There was used a phenolic resin material providing a flow amount of 5 g when subjected to the flow test by extrusion method according to JIS K 6911 under the conditions of test mold temperature=140° C. and extrusion pressure=150 kgf/cm$^2$ (the flow amount obtained by the above test is hereinafter referred to simply as flow amount).

The temperatures of the cylinder zones and the die were set as follows.

Cylinder $C_1$ (0 to 2D): water-cooled
$C_2$ (3D to 6D): 80° C.
$C_3$ (7D to 10D): 105° C.
$C_4$ (11D to 12D): 130° C.

Die: 165° C.

The screw rotation was set at 8 rpm.

A pipe having an outside diameter of 9 mm and a wall thickness of 2 mm could be obtained continuously by extrusion. The properties of the pipe are shown in Table 1.

EXAMPLE 2

Extrusion was effected in the same manner as in Example 1 except that the outside diameter of the mandrel was changed to 8 mm, the diameter and length of the die were changed to 12 mm and 300 mm, respectively, and the rotation of the screw was changed to 12 rpm.

The construction of the die flow path and the properties of the pipe obtained are shown in Table 1.

EXAMPLE 3

Extrusion was effected in the same manner as in Example 1 except that there was used a phenolic resin material providing a flow amount of 0.2 g in the flow test, the outside diameter of the mandrel was changed to 11 mm, the diameter and length of the die were changed to 16 mm and 300 mm, respectively, and the rotation of the screw was changed to 15 rpm.

The construction of the die flow path and the properties of the pipe obtained are shown in Table 1.

EXAMPLE 4

Extrusion was effected in the same manner as in Example 1 except that there was used a phenolic resin material providing a flow amount of 18 g in the flow test, the outside diameter of the mandrel was changed to 18 mm, the diameter and length of the die were changed to 24 mm and 400 mm, respectively, and the rotation of the screw was changed to 20 rpm.

The construction of the die flow path and the properties of the pipe obtained are shown in Table 1.

EXAMPLE 5

A phenolic resin material providing a flow amount of 4 g in the flow test was used. An extruder having a cylinder diameter of 50 mm and an L/D ratio of 12 was used. The cylinder contained a full-flight screw having a feed zone 7D, a compression zone 1D, a metering zone 4D and a compression ratio of 1.5. A mandrel having an outer diameter of 22 mm was inserted into the screw along the screw axis. To the front end of the cylinder was fitted a die having a diameter of 39 mm, a length of 508 mm and a flow path construction as shown in Table 1. Using the above resin material and extruder, extrusion was effected.

The temperatures of the cylinder zones and the die were set as follows.

Cylinder $C_1$ (0 to 2D): water-cooled $C_2$ (3D to 5D): 80° C.

$C_3$ (6D to 8D): 90° C.

$C_4$ (9D to 10D): 100° C.

$C_5$ (11D to 12D): 130° C.

Die: 170° C.

The screw rotation was set at 10 rpm.

A pipe having an outside diameter of 39 mm and a wall thickness of 8.5 mm could be obtained continuously by extrusion. The properties of the pipe are shown in Table 1.

EXAMPLE 6

Extrusion was effected in the same manner as in Example 5 except that the outside diameter of the mandrel was changed to 32 mm.

The properties of the pipe obtained are shown in Table 1.

COMPARATIVE EXAMPLE 1

Extrusion was effected in the same manner as in Example 1 except that the outside diameter of the mandrel was changed to 2 mm, the diameter and length of the die were changed to 6 mm and 300 mm, respectively, and the rotation of the screw was changed to 6 rpm. Extrusion load increased suddenly in about 5 minutes from the start of extrusion, and the continuation of extrusion became impossible. The construction of the die flow path is shown in Table 1.

COMPARATIVE EXAMPLE 2

Extrusion was effected in the same manner as in Example 1 except that the outside diameter of the mandrel was changed to 37 mm, the diameter and length of the die were changed to 45 mm and 508 mm, respectively, the rotation of the screw was changed to 25 rpm, and the temperatures of the cylinder $C_4$ zone and the die were changed to 135° C. and 175° C., respectively. Extrusion load increased suddenly in about 4 minutes from the start of extrusion, and the continuation of extrusion became impossible. The construction of the die flow path is shown in Table 1.

COMPARATIVE EXAMPLE 3

Extrusion was effected in the same manner as in Example 3 except that the outside diameter of the mandrel was changed to 6 mm, the diameter and length of the die were changed to 8 mm and 300 mm, respectively, the rotation of the screw was changed to 6 rpm, and the temperatures of the cylinder $C_4$ zone and the die were changed to 125° C. and 175° C. Extrusion load increased in about 5 minutes from the start of extrusion, and the continuation of extrusion became impossible. The construction of the die flow path is shown in Table 1.

COMPARATIVE EXAMPLE 4

Extrusion was effected in the same manner as in Example 5 except that the outside diameter of the mandrel was changed to 1 mm, the diameter and length of the die were changed to 45 mm and 508 mm, respectively, the rotation of the screw was changed to 20 rpm, the temperatures of the cylinder $C_5$ zone and the die were changed to 140° C. and 160° C. and a phenolic resin material providing a flow amount of 5 g was used. Extrusion load increased suddenly in about 5 minutes from the start of extrusion, and the continuation of extrusion became impossible. The construction of the die flow path is shown in Table 1.

COMPARATIVE EXAMPLE 5

Extrusion was effected in the same manner as in Example 1 except that the inclination angle of the flow path-changing portion of the die was changed as shown in Table 1. Extrusion load was not stable and it was impossible to obtain a pipe of homogeneous quality.

COMPARATIVE EXAMPLE 6

Extrusion was effected in the same manner as in Example 1 except that a phenolic resin material providing a flow amount of 35 g was used. The properties of the pipe obtained are shown in Table 1. Continuous extrusion was possible but the pipe surface had no gloss and was rough.

COMPARATIVE EXAMPLE 7

Extrusion was effected in the same manner as in Example 1 except that the temperature of the cylinder $C_4$ zone was changed to 110° C. Extrusion load fluctuated largely and soon became high, which made extrusion impossible.

COMPARATIVE EXAMPLE 8

Extrusion was effected in the same manner as in Example 1 except that the temperature of the cylinder $C_4$ zone was changed to 155° C. and the temperature of the die was changed to 175° C. Extrusion load increased suddenly in about 15 minutes from the start of extrusion and the continuation of extrusion became impossible.

COMPARATIVE EXAMPLE 9

Extrusion was effected in the same manner as in Example 1 except that the temperature of the cylinder C4 zone was changed to 125° C. and the temperature of the die was changed to 140° C. The properties of the pipe obtained are shown in Table 1. The pipe had insufficient curing and, when heated to, for example, 135° C., was deformed even by a small force.

COMPARATIVE EXAMPLE 10

It was tried to produce a pipe of 16 mm in outside diameter and 2.5 mm in wall thickness by extrusion according to the technique disclosed in U.S. Pat. No. 4,797,242. The same phenolic resin material as in Example 1 was used. Screw breakage occurred when the extruder front end began to deliver a glossy pipe, and the continuation of extrusion became impossible.

TABLE 1

| | Construction of die flow path | | | Heating temp. (°C.) | | Flow amount | Properties of pipe | | |
|---|---|---|---|---|---|---|---|---|---|
| | Ratio of outside diameters $R_1/R_2$ | Ratio of flow path cross-sectional areas $S_1/S_2$ | Inclination angle of flow path-changing portion (°) | Cylinder zone communicating with die inlet | Die | of material in flow test by extrusion method (g) | Bending strength (kg/mm²) | Bending modulus kg/mm²) | Other pipe properties or extrudability |
| Example | | | | | | | | | |
| 1 | 0.30 | 0.18 | 15 | 130 | 165 | 5 | 17.5 | 2370 | Continuous extrusion |
| 2 | 0.40 | 0.25 | 25 | 130 | 165 | 5 | 16.3 | 2110 | Same as above |
| 3 | 0.53 | 0.42 | 25 | 130 | 165 | 0.2 | 11.0 | 1550 | Same as above |
| 4 | 0.80 | 0.78 | 25 | 130 | 165 | 18 | 12.1 | 1440 | Same as above |
| 5 | 0.78 | 1.41 | 15 | 130 | 170 | 4 | 9.8 | 860 | Same as above |
| 6 | 0.78 | 0.68 | 15 | 130 | 170 | 4 | 10.7 | 980 | Same as above |
| Comparative Example | | | | | | | | | |
| 1 | 0.20 | 0.10 | 25 | 130 | 165 | 5 | | | Extrusion stopped in 5 minutes. |
| 2 | 1.50 | 2.02 | 25 | 135 | 175 | 5 | | | Extrusion stopped in 4 minutes. |
| 3 | 0.27 | 0.09 | 25 | 125 | 175 | 0.2 | | | Extrusion stopped in 5 minutes. |
| 4 | 0.90 | 2.70 | 10 | 140 | 160 | 5 | | | Same as above |
| 5 | 0.30 | 0.18 | 40 | 130 | 165 | 5 | | | Extrusion was impossible. |
| 6 | 0.30 | 0.18 | 15 | 130 | 165 | 35 | | | Surface condition was poor. |
| 7 | | | | 110 | 165 | 5 | | | |
| 8 | | | | 155 | 175 | 5 | | | Extrusion stopped in 15 minutes. |
| 9 | 0.30 | 0.18 | 15 | 125 | 140 | 5 | | | Curing was insufficient. |
| 10 | Torpedo was used. | | | | | 5 | | | Screw broke. |

What is claimed is:

1. An extrusion method for preparing a phenolic resin pipe with an extruder comprising a screw, a cylinder, a die comprising an inlet and an outlet and defining a flow path, and a mandrel, the mandrel being inserted into a through-hole formed in the screw along the screw axis and protruding into the die along the screw axis so as to be able to more forward and backward and being fitted to the screw so as to be able to freely rotate independently from the screw or the mandrel being firmly fitted to the front end of the screw so as to be able to rotate synchronously with the screw, the die satisfying the following formulas $$R_1/R_2=0.25\sim1.0$$

$$S_1/S_2=0.1\sim2.5$$

where $R_1$ is an outside diameter of the die flow path at the die outlet, $S_1$ is a cross-sectional area of the die flow path at the die outlet, $R_2$ is an outside diameter of the die flow path at the die inlet, and $S_2$ is a cross-sectional area of the die flow path at the die inlet, wherein the die further comprises a uniform flow path portion having the same cross section as the die outlet and a length of 1D to 300D where D is the inside diameter of the die, said uniform flow path portion being spaced from the die inlet and wherein an outer periphery of the die flow path is inclined from the die inlet to the uniform flow path portion with the inclination not greater than 35° with respect to the axis of the screw, which method comprises shaping and extruding a phenolic resin material whereby the material after extrusion is cured so as to be able to retain its shape, by controlling the temperature of a heating zone of the cylinder communicating with the die inlet.

2. The extrusion method of claim 1, wherein the flow amount of the phenolic resin material, when subjected to the flow test by extrusion method according to JIS K 6911, is 0.05–25 g.

3. The extrusion method of claim 1, wherein the temperature of the heating zone of the cylinder at the back of the die inlet is controlled at 125–140° C. and the temperature of the die is controlled at 150–185° C.

4. The extrusion method of claim 1, wherein the die satisfies the following formulas $$R_1/R_2=0.3\sim0.9$$

$$S_1/S_2=0.15\sim2.0$$

where $R_1$ is an outside diameter of the die flow path at the die outlet, $S_1$ is a cross-sectional area of the die flow path at the die outlet, $R_2$ is an outside diameter of the die flow path at the die inlet, and $S_2$ is a cross-sectional area of the die flow path at the die inlet.

5. The extrusion method of claim 1, wherein the inclination of the outer periphery of the die flow path portion from the die inlet to the starting point of the uniform flow path portion having the same cross section as the die outlet is not larger than 30° with respect to the axis of the screw.

6. The extrusion method of claim 1, wherein the length of the uniform flow path portion of the die having the same cross section as the die outlet is 5D to 20D.

7. An extruder for preparing a phenolic resin pipe, comprising a screw having a feed zone, a compression zone and a metering zone, a cylinder having heating means corresponding to the feed zone, the compression zone and the metering zone, a die fitted to the front end of the cylinder, having a heating means, and a mandrel inserted into a through-hole formed in the screw along the screw axis and protruding into the die along the screw axis, or firmly fitted to the front end of the screw, the die satisfying the following formulas $$R_1/R_2=0.25\sim1.0$$

$$S_1/S_1=0.1\sim2.5$$

where $R_1$ is an outside diameter of the die flow path at the die outlet, $S_1$ is a cross-sectional area of the die flow path at the die outlet, $R_2$ is an outside diameter of the die flow path at the die inlet, and $S_2$ is a cross-sectional area of the die flow path at the die inlet, wherein the die further comprises a uniform flow path portion having the same cross section as the die outlet and a length of 1D to 300D where D is the inside diameter of the die, said uniform flow path portion being spaced from the die inlet and wherein an outer periphery of the die flow path is inclined from the die inlet to the uniform flow path portion with the inclination not greater than 35° with respect to the axis of the screw.

* * * * *

UNITED STATES PATENT AND TRADEMARK OFFICE
CERTIFICATE OF CORRECTION

PATENT NO. : 5,204,039

DATED : April 20, 1993

INVENTOR(S) : Miyasaka et al.

It is certified that error appears in the above-identified patent and that said Letters Patent is hereby corrected as shown below:

Column 9, line 59, delete "more" and insert therefor --move--.

Column 12, line 7, amend "$S_1/S_1$" to --$S_1/S_2$--.

Signed and Sealed this

First Day of March, 1994

Attest:

BRUCE LEHMAN

Attesting Officer

*Commissioner of Patents and Trademarks*